United States Patent
Nam et al.

(10) Patent No.: US 8,489,087 B2
(45) Date of Patent: Jul. 16, 2013

(54) APPARATUS AND METHOD FOR CONTROLLING SMALL BASE STATION

(75) Inventors: Seung Woo Nam, Namyangju-si (KR); Sung Kuk Kim, Seoul (KR)

(73) Assignee: Pantech Co., Ltd., Seoul (KR)

( * ) Notice: Subject to any disclaimer, the term of this patent is extended or adjusted under 35 U.S.C. 154(b) by 51 days.

(21) Appl. No.: 12/947,679

(22) Filed: Nov. 16, 2010

(65) Prior Publication Data
US 2011/0143740 A1    Jun. 16, 2011

(30) Foreign Application Priority Data
Dec. 15, 2009  (KR) .................. 10-2009-0124643

(51) Int. Cl.
*H04W 24/00*    (2009.01)

(52) U.S. Cl.
USPC .......... 455/423; 455/419; 455/436; 455/444; 455/501; 370/311; 370/328; 370/336

(58) Field of Classification Search
USPC .................. 455/419, 436, 444; 370/311, 328, 370/336
See application file for complete search history.

(56) References Cited

U.S. PATENT DOCUMENTS

| | | | |
|---|---|---|---|
| 2006/0165032 A1 | 7/2006 | Hamalainen et al. | |
| 2009/0098885 A1 | 4/2009 | Gogic et al. | |
| 2009/0252073 A1* | 10/2009 | Kim et al. | 370/311 |
| 2009/0253421 A1 | 10/2009 | Camp et al. | |
| 2009/0285143 A1* | 11/2009 | Kwun et al. | 370/311 |
| 2010/0048212 A1* | 2/2010 | Yavuz et al. | 455/436 |
| 2010/0111047 A1* | 5/2010 | Yang et al. | 370/336 |
| 2011/0134833 A1* | 6/2011 | Gogic | 370/328 |
| 2011/0244870 A1* | 10/2011 | Lee | 455/444 |

FOREIGN PATENT DOCUMENTS

| | | |
|---|---|---|
| KR | 1020090037636 | 4/2009 |
| KR | 10-0912505 | 8/2009 |
| KR | 1020090105877 | 10/2009 |
| KR | 10-2009-0126282 | 12/2009 |

\* cited by examiner

*Primary Examiner* — David Q Nguyen
(74) *Attorney, Agent, or Firm* — H.C. Park & Associates, PLC

(57) ABSTRACT

An apparatus and a method for controlling a small base station using a macro base station may reduce interference between the small base station and the macro base station. The method includes determining whether a small base station is in a blank state; transmitting a deactivation request message to the macro base station if the small base station is in the blank state; and operating the small base station in an inactive mode if a deactivation response message is received from the macro base station. The inactive mode being a mode of the small base station in which a synchronization channel or a minimal channel is transmitted to enable a terminal in the cell area of the small base station to identify the small base station.

13 Claims, 5 Drawing Sheets

APPARATUS AND METHOD FOR CONTROLLING SMALL BASE STATION

CROSS-REFERENCE TO RELATED APPLICATION

This application claims priority from and the benefit under 35 U.S.C. §119(a) of Korean Patent Application No. 10-2009-0124643, filed on Dec. 15, 2009, in the Korean Intellectual Property Office, which is hereby incorporated by reference for all purposes as if fully set forth herein.

BACKGROUND

1. Field

This disclosure relates to an apparatus and a method for controlling a small base station to reduce interference.

2. Discussion of the Background

Femto cells enable service providers to use additional network resources to is supplement cell coverage and provide users with improved services at a low cost in an area having poor cell coverage. Also, the femto cells enable users to use continuous services between femto cell areas and other cell areas without changing their terminals and to enjoy services in femto cell areas at a low cost.

According to the current market trend, it is expected that femto cell use will increase geometrically. In this context, individual users can buy femto cells like terminals, install the femto cells, and use communication services at a low cost.

When femto cells are installed in a home or an office, interference may occur in overlapping areas between a femto cell and a macro cell, or between femto cells. The interference may result in deterioration of service quality and difficult cell planning. Thus, when users intend to install femto cells, the users should take into account the interference with nearby macro cells and adjacent femto cells.

Since the number of available terminals in a femto cell is limited, a terminal may not camp on a cell area of the femto cell. However, even if there is not terminal in the cell area of the femto cell, the femto cell operates in an active mode and uses more of a channel resource than is necessary and results in adjacent cell interference.

SUMMARY

Exemplary embodiments of the present invention provide an apparatus and a method for controlling a small base station to reduce interference.

Exemplary embodiments of the present invention provide an apparatus and a method for controlling a small base station depending on a determination of a macro base station on whether the small base station is in a blank state.

Exemplary embodiments of the present invention provide an apparatus and a method for controlling a small base station having permission of a macro base station if a terminal is not camping on a cell area of the small base station.

Exemplary embodiments of the present invention provide an apparatus and a method for controlling a small base station, in which a small base station in a blank state, i.e., a small base station without a terminal camping on a cell area of the small base station is deactivated having permission of a macro base station, thereby reducing adjacent cell interference and decreasing power consumption.

Additional features of the invention will be set forth in the description which follows, and in part will be apparent from the description, or may be learned by practice of the invention.

An exemplary embodiment of the present invention discloses a method for controlling a small base station, including determining whether the small base station is in a blank state; transmitting a deactivation request message to a macro base station if the small base station is in the blank state; and operating the small base station in an inactive mode if a deactivation response message is received from the macro base station, the inactive mode being a mode of the small base station in which a synchronization channel or a minimal channel is transmitted to enable a terminal in a cell area of the small base station to identify the small base station.

An exemplary embodiment of the present invention discloses a method for controlling a small base station by a macro base station, the method including receiving, from the small base station, a deactivation request message requesting permission to deactivate the small base station, determining whether a terminal handed over to the small base station exists; and is transmitting, to the small base station, a deactivation response message permitting the deactivation of the small base station if there is no terminal handed over to the small base station.

An exemplary embodiment of the present invention discloses a small base station including a blank sensing unit to determine whether the small base station is in a blank state; and a deactivating unit to transmit a deactivation request message to a macro base station if the small base station is in the blank state, and to enable the small base station to operate in an inactive mode if a deactivation response message is received from the macro base station, the inactive mode being a mode of the small base station in which a synchronization channel or a minimal channel is transmitted to enable a terminal in a cell area of the small base station to identify the small base station.

An exemplary embodiment of the present invention discloses a macro base station to control a small base station, the macro base station including a deactivation request receiving unit to receive, from the small base station, a deactivation request message requesting permission to deactivate the small base station; a handover sensing unit to determine whether a terminal handed over to the small base station exists; and a deactivating unit to transmit, to the small base station, a deactivation response message permitting the deactivation of the small base station if a terminal handed over to the small base station does not exist.

An exemplary embodiment of the present invention discloses a communication system including a small base station, a macro base station, and a terminal, a cell area of the small base station at least partially overlapping with a cell area of the macro base station, and the terminal being connectable to each of the small base station and the macro base station, wherein the small base station includes: a blank sensing unit to determine whether the small base station is in a blank state; and a deactivating unit to transmit a deactivation request message to a macro is base station if the small base station is in the blank state, and to enable the small base station to operate in an inactive mode if a deactivation response message is received from the macro base station, the inactive mode being a mode of the small base station in which a synchronization channel or a minimal channel is transmitted to enable a terminal in a cell area of the small base station to identify the small base station, and wherein the macro base station includes: a deactivation request receiving unit to receive, from the small base station, a deactivation request message requesting permission to deactivate the small base station; a handover sensing unit to determine whether a terminal handed over to the small base station exists; and a deactivating unit to transmit, to the small base station, a deactivation response message permitting the deactivation of the small base station if a terminal handed over to the small base station does not exist.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
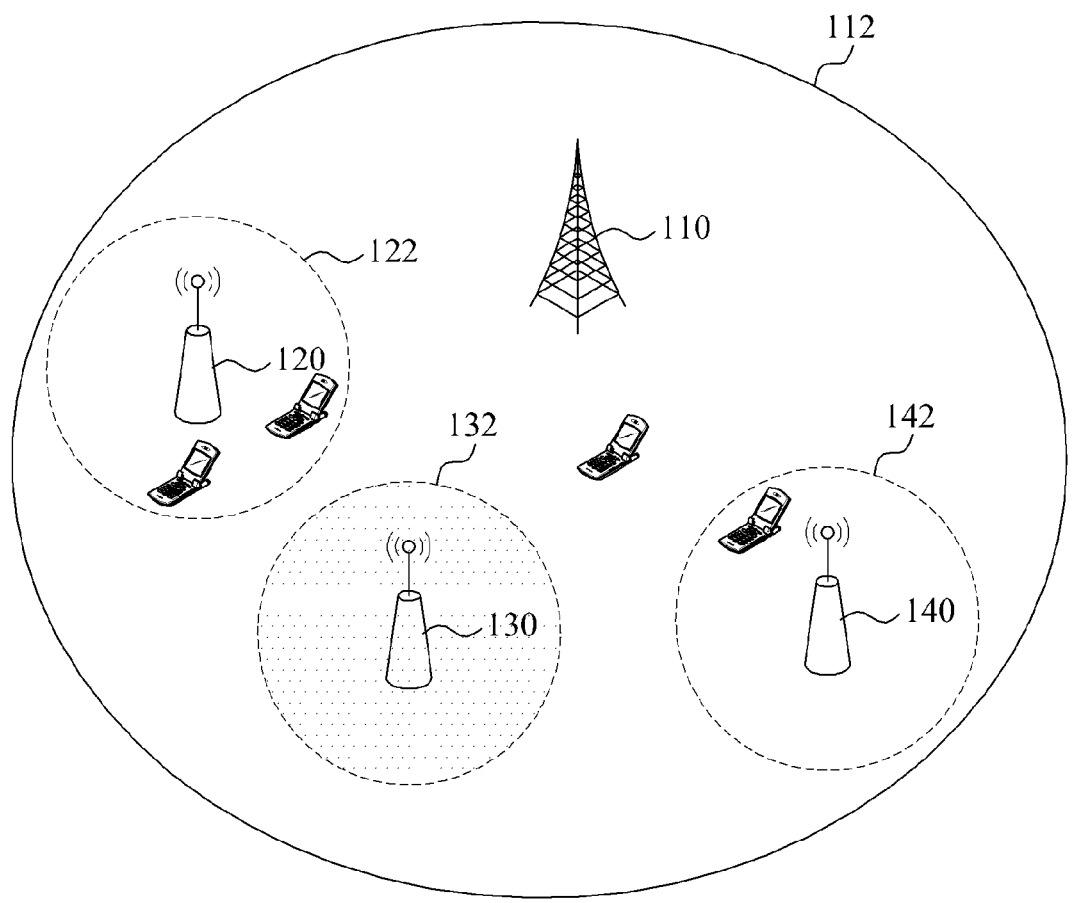
FIG. 1 is a diagram illustrating a communication system including base stations according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element is referred to as being "connected to" another element, it can be directly connected to the other element, or intervening elements may be present.

Exemplary embodiments of the present invention relate to an apparatus and a method for controlling a small base station, in which a small base station is deactivated with permission of a macro base station if there is no terminal camping on a cell area of the small base station.

FIG. 1 is a diagram illustrating a communication system including base stations is according to aspects of the present invention. Referring to FIG. 1, a communication system may include a macro base station 110, and a plurality of small base stations 120, 130, and 140 operating in a cell area 112 of the macro base station 110.

The small base stations 120, 130, and 140 can provide communication services to terminals that respectively belong to cell areas 122, 132, and 142 of the small base stations 120, 130, and 140. Although referred to as the macro base station 110 and the small base stations 120, 130, and 140, aspects are not limited thereto such the macro base station 110 and the small base stations 120, 130, and 140 need not be "macro" and "small" base stations. Further, sizes of the respective cell areas 112, 122, 132, and 142 need not be limited to as shown in FIG. 1 such that the respective cell areas 122, 132, and 142 may be only partially overlapping with the cell area 112 of the macro base station 110.

Since cell areas of the small base stations 120, 130, and 140 are relatively definite and a number of terminals served by the small base stations 120, 130, and 140 is limited, the small base stations 120, 130, and 140 may not have a terminal camping on its cell area, for example, such as the small base station 130.

Hereinafter, a state in which no terminal is camping on in a cell area of a small base station, for example, the cell area 132 of the small base station 130, is referred to hereinafter as a "blank state".

Figure 2:
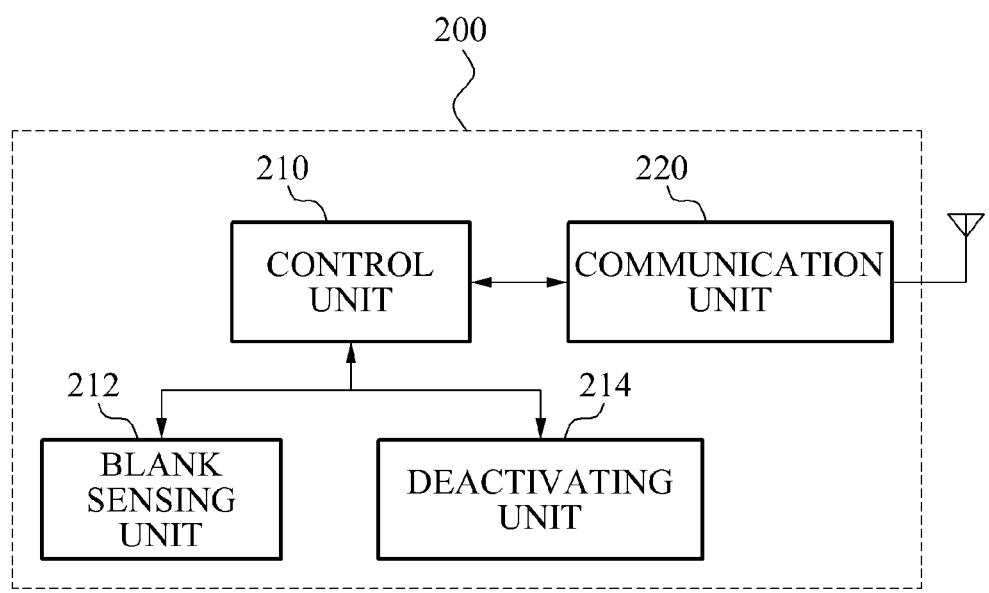
FIG. 2 is a diagram illustrating a structure of a small base station according to an exemplary embodiment of the present invention.

FIG. 2 is a diagram illustrating a structure of a small base station 200 according to an exemplary embodiment of the present invention. Referring to FIG. 2, the small base station 200 may include a control unit 210, a blank sensing unit 212, a deactivating unit 214, and a communication unit 220.

The communication unit 220 provides a communication connection to a terminal is camping on a cell area of the small base station 200. Also, the communication unit 220 may transmit a deactivation request message to the macro base station 300 and receive a deactivation response message or a deactivation rejection message from the macro base station 300.

The blank sensing unit 212 senses a blank state of the small base station 200 in which a terminal is not camping on a cell area of the small base station 200. If a blank state is sensed, the deactivating unit 214 generates a deactivation request message and the communication unit 220 transmits the deactivation request message to the macro base station 300. If receiving a deactivation rejection message from the macro base station 300, the deactivating unit 214 enables the small base station 200 to operate in an inactive mode in which a synchronization channel or a minimal channel is maintained to enable a terminal to identify the presence of the small base station 200. The synchronization channel or the minimal channel may be the only channels maintained in the inactive mode of the small base station 200.

If the small base station 200 is not in a blank state, or if the deactivating unit 214 receives a deactivation rejection message from the macro base station 300, the deactivating unit 214 enables the small base station 200 to operate in an active mode in which the small base station 200 can normally serve a terminal in the cell area of the small base station 200.

The control unit 210 controls the operation of the small base station 200, and controls the blank sensing unit 212 and the deactivating unit 214 according to an exemplary embodiment of the present invention. That is, the control unit 210 may perform functions of the blank sensing unit 212 and the deactivating unit 214. Although the functions of the blank sensing unit 212 and the deactivating unit 214 are described separately, the control unit 210 may be configured to handle all or a part of the functions.

Figure 3:
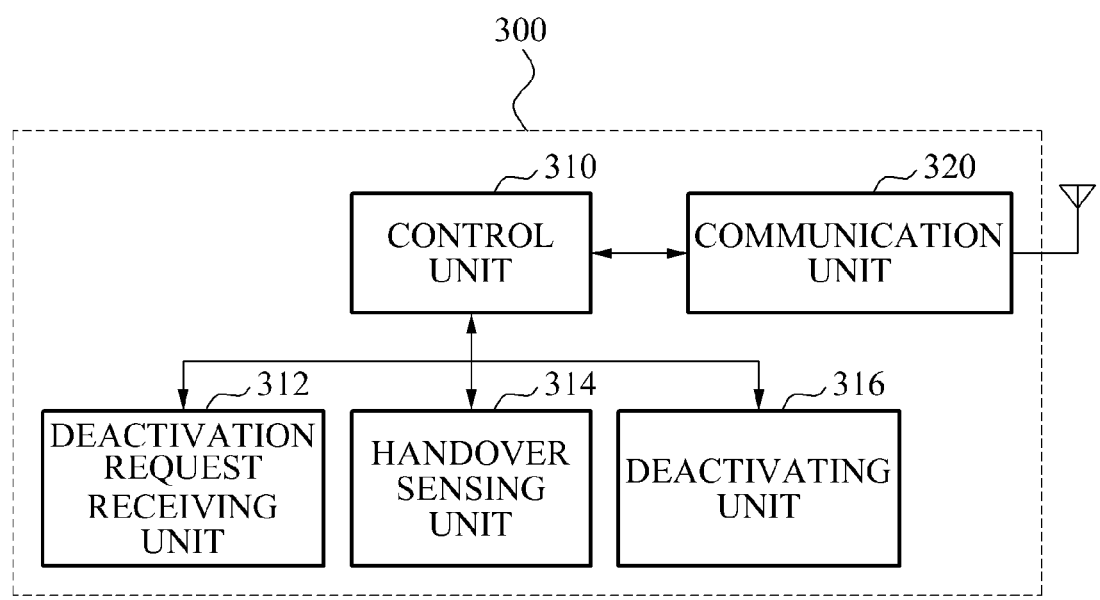
FIG. 3 is a diagram illustrating a structure of a macro base station according to an exemplary embodiment of the present invention.

FIG. 3 is a diagram illustrating a structure of a macro base station 300 according is to an exemplary embodiment of the present invention. Referring to FIG. 3, the macro base station 300 may include a control unit 310, a deactivation request receiving unit 312, a handover sensing unit 314, a deactivating unit 316, and a communication unit 320.

The communication unit 320 provides a communication connection to a terminal camping on a cell area of the macro base station 300. Also, the communication unit 320 may receive a deactivation request message from the small base station 200 of FIG. 2, and transmit a deactivation response message or a deactivation rejection message to the small base station 200.

The deactivation request receiving unit 312 receives a deactivation request message via the communication unit 320, reads the deactivation request message, and determines information of the small base station from which the deactivation request message was received.

The handover sensing unit 314 senses whether a terminal handed over to the small base station which transmitted the deactivation request message exists. If a terminal handed over to the small base station which transmitted the deactivation request message exists, the deactivating unit 316 transmits to the small base station 200 a deactivation rejection message to prevent the small base station 200 from switching to an inactive mode.

Conversely, if a terminal handed over to the small base station which transmitted the deactivation request message does not exist, the deactivating unit 316 transmits to the small base station 200 a deactivation response message to allow the small base station 200 to switch to an active mode.

The control unit 310 controls the operation of the macro base station 300, and controls the deactivation request receiving unit 312, the handover sensing unit 314, and the deactivating unit 316 according to an exemplary embodiment of the present invention. That is, the control unit 210 may perform functions of the deactivation request receiving unit 312, the is handover sensing unit 314, and the deactivating unit 316. Although the functions of the deactivation request receiving unit 312, the handover sensing unit 314, and the deactivating unit 316 are described separately, the control unit 310 may be configured to handle all or a part of the functions.

Hereinafter, a method for controlling a small base station according to an exemplary embodiment of the present invention is described with reference to the accompanying drawings as follows.

Figure 4:
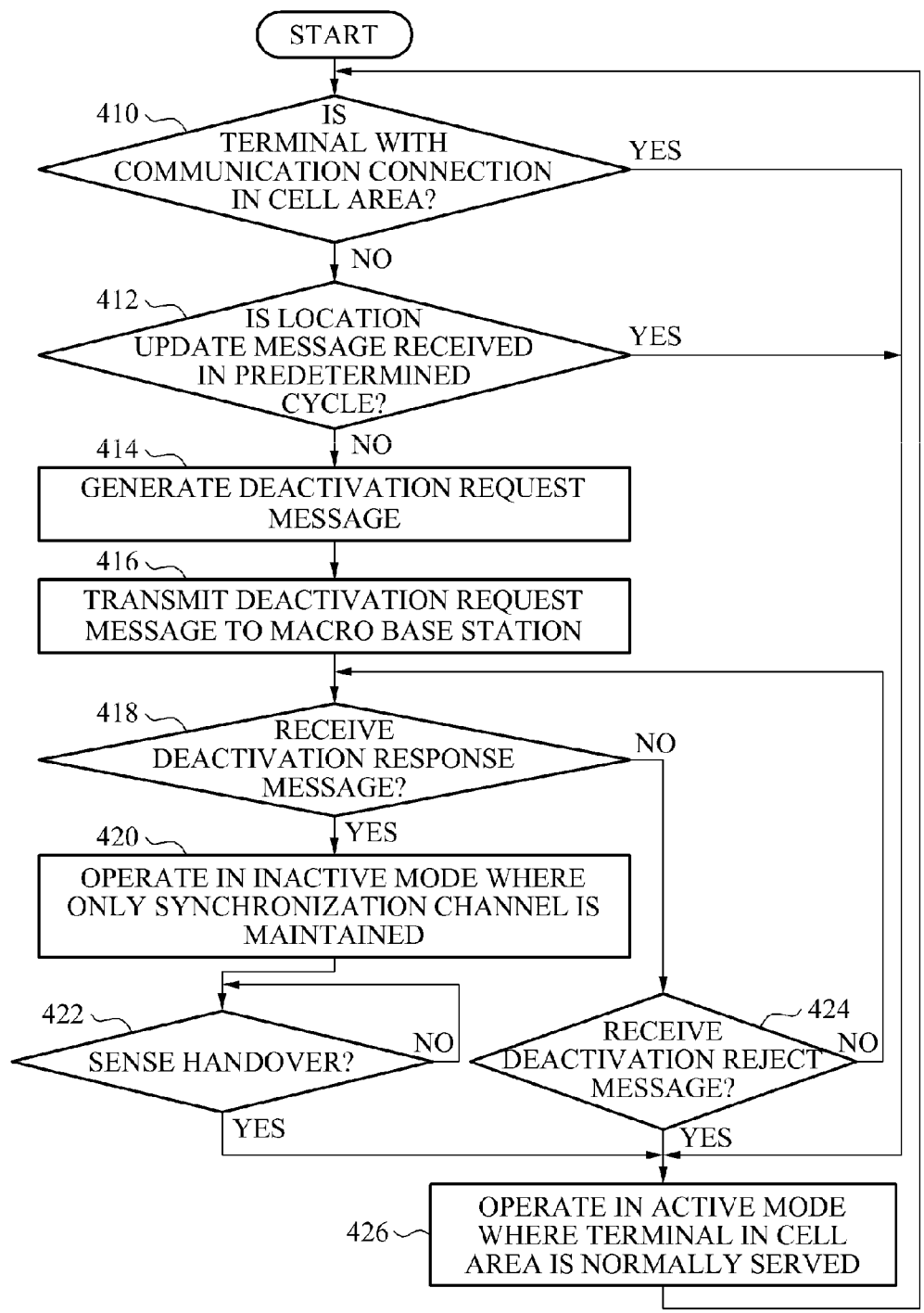
FIG. 4 is a flowchart illustrating a method in which a small base station is controlled according to an exemplary embodiment of the present invention.

FIG. 4 is a flowchart illustrating a method in which a small base station is controlled according to an exemplary embodiment of the present invention. Referring to FIG. 4, the small base station 200 of FIG. 2 determines whether a terminal with a communication connection is in a cell area of the small base station 200 in operation 410.

If a terminal with a communication connection is in the cell area of the small base station 200, the small base station 200 operates in an active mode in which the small base station 200 can serve the terminal in the cell area of the small base station 200 in operation 426.

If a terminal with a communication connection is not in the cell area of the small base station 200, the small base station 200 determines whether a terminal is camping on a cell area of the small base station 200 by determining whether a location update message is received in a preset cycle in operation 412.

If the location update message is received in a preset cycle, i.e., a terminal is camping on a cell area of the small base station 200, the small base station 200 operates in an active mode in which the small base station 200 can serve a terminal in the cell area of the small base station 200 in operation 426.

If the location update message is not received in a preset cycle, i.e., a terminal is is not camping on a cell area of the small base station 200, the small base station 200 generates a deactivation request message in operation 414.

Then, the small base station 200 transmits the generated deactivation request message to the macro base station 300 in operation 416.

Next, the small base station 200 determines whether the small base station 200 receives a deactivation response message from the macro base station 300 in operation 418.

If the small base station 200 receives a deactivation response message from the macro base station 300, the small base station 200 operates in an inactive mode in which a synchronization channel or a minimal channel is maintained to enable a terminal to identify the presence of the small base station 200 in operation 420.

If handover to the small base station 200 is sensed in operation 422, the small base station 200 operates in an active mode in which the small base station 200 can serve a terminal in its cell area in operation 426.

If the small base station 200 does not receive a deactivation response message from the macro base station 300 in operation 418, the small base station 200 determines whether the small base station 200 receives a deactivation rejection message from the macro base station 300 in operation 424.

If the small base station 200 receives a deactivation rejection message from the macro base station 300 in operation 424, the small base station 200 operates in an active mode in which the small base station 200 can serve a terminal in its cell area in operation 426. A case in which the small base station 200 receives a deactivation rejection message from the macro base station 300 may be a case in which a terminal handed over from the macro base station 300 to the small base station 200 exists.

If the small base station 200 does not receive a deactivation rejection message from the macro base station 300 in operation 424, operation of the small base station 200 may return to operation 410 or operation 418 (as shown in FIG. 4). After operation 426 is completed, operation of the small base station 200 may return to operation 410.

Figure 5:
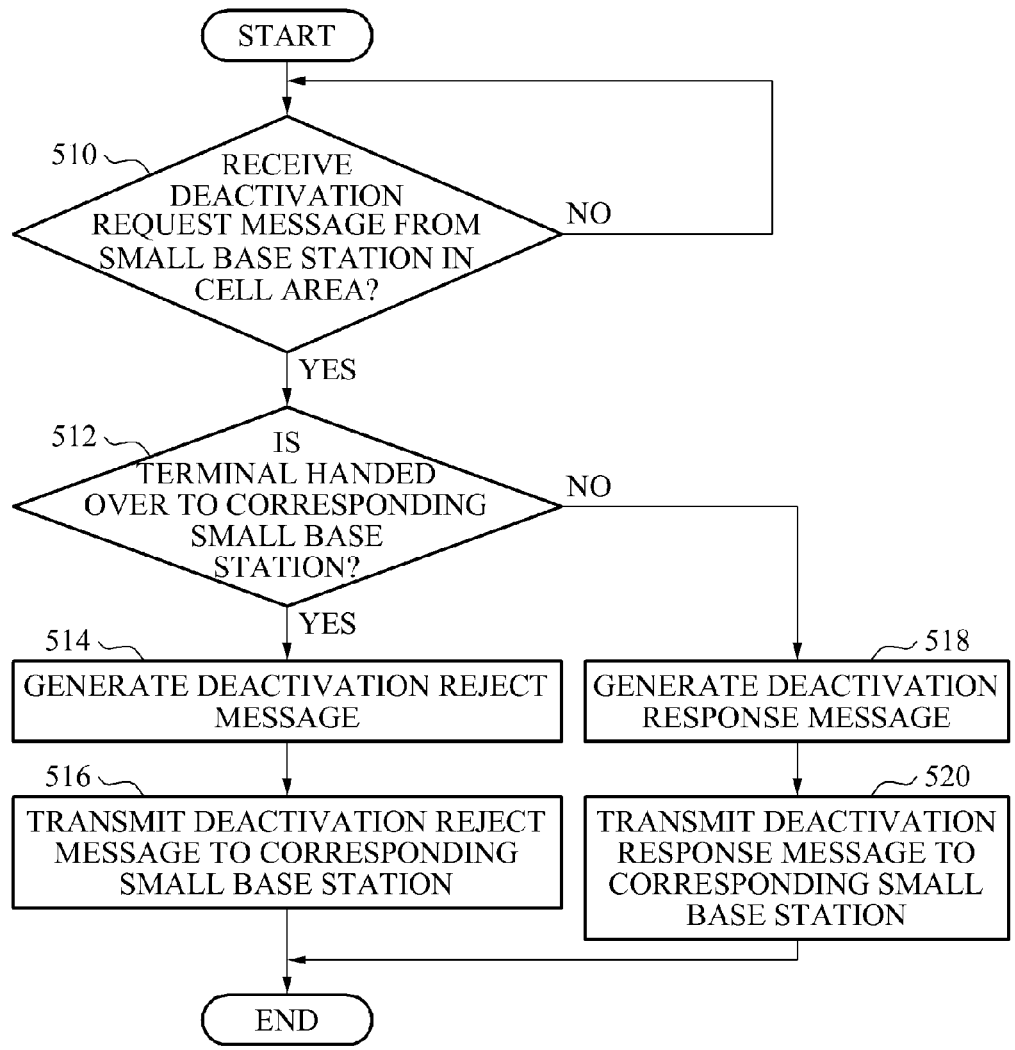
FIG. 5 is a flowchart illustrating a method for controlling a small base station according to an exemplary embodiment of the present invention.

FIG. 5 is a flowchart illustrating a method for controlling a small base station according to an exemplary embodiment of the present invention. Referring to FIG. 5, if the macro base station 300 of FIG. 3 receives a deactivation request message from the small base station 200 of FIG. 2 in the cell area of the macro base station 300 in operation 510, the macro base station 300 determines whether a terminal is handed over to the corresponding small base station 200 in operation 512. The handover of a terminal may be sensed by receiving, from the small base station 200, a message indicating that the terminal was handed over to the small base station 200 or a message indicating that the terminal will be handed over to the small base station 200.

If a terminal is or will be handed over to the corresponding small base station 200, the macro base station 300 generates a deactivation rejection message in operation 514, and transmits the deactivation rejection message to the corresponding small base station 200 in operation 516.

If no terminal is or will be handed over to the corresponding small base station 200, the macro base station 300 generates a deactivation response message in operation 518, and transmits the deactivation response message to the corresponding small base station 200 in operation 520.

The above-described exemplary embodiments of the present invention may be recorded in non-transitory computer-readable media including program instructions to implement various operations embodied by a computer. The media may also include, alone or in combination with the program instructions, data files, data structures, or the like. The program instructions included in the media are specially designed and configured for the present invention, but may include typical program instructions that are known and available to computer software programmers in the art. Examples of non-transitory computer-readable media include magnetic media, such as hard disks, floppy disks, and magnetic tape; optical media, such as CD-ROM disks and DVDs; magneto-optical media, such as optical disks; and hardware devices that are specially configured to store and perform program instructions, such as read-only memory (ROM), random access memory (RAM), flash memory, or the like. Examples of program instructions include both machine code, such as produced by a compiler, and higher level code that may be executed by the computer using an interpreter. The above-described hardware devices may be configured to act as one or more software modules in order to perform the operations of the above-described exemplary embodiments of the present invention, or vice versa.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for controlling a small base station, comprising:
   determining whether the small base station is in a blank state;
   transmitting a deactivation request message to a macro base station if the small base station is in the blank state;
   operating the small base station in an inactive mode if a deactivation response message is received from the macro base station, the inactive mode being a mode of the small base station in which a synchronization channel or a minimal channel is transmitted to enable a terminal in a cell area of the small base station to identify the small base station; and
   operating the small base station in an active mode if a deactivation rejection message is received from the macro base station, the active mode being a mode of the small base station in which the small base station serves a terminal in the cell area of the small base station.

2. The method of claim 1, wherein the cell area of the small base station is inside a cell area of the macro base station.

3. The method of claim 1, further comprising:
   operating the small base station in an active mode if the small base station is not in the blank state, the active mode being a mode of the small base station in which the small base station serves a terminal in the cell area of the small base station.

4. The method of claim 1, wherein the blank state is a state in which a terminal with a communication connection is not in the cell area of the small base station and a location update message is not received in a preset cycle.

5. The method of claim 1, wherein the blank state is a state in which no terminal is camping on the cell area of the small base station.

6. The method of claim 1, further comprising:
   sensing a handover of a terminal to the small base station; and
   operating the small base station in an active mode in response to the sensed handover.

7. A method for controlling a small base station by a macro base station, the method comprising:
   receiving, from the small base station, a deactivation request message requesting permission to deactivate the small base station;
   determining, by the macro base station, whether a terminal handed over to the small base station exists;
   transmitting, to the small base station, a deactivation response message permitting the deactivation of the small base station if a terminal handed over to the small base station is determined not to exist; and
   transmitting, to the small base station, a deactivation rejection message not permitting the deactivation of the small base station if a terminal handed over to the small base station is determined to exist.

8. A small base station, comprising:
   a blank sensing unit to determine whether the small base station is in a blank state; and
   a deactivating unit to transmit a deactivation request message to a macro base station if the small base station is in the blank state, to enable the small base station to operate in an inactive mode if a deactivation response message is received from the macro base station, the inactive mode being a mode of the small base station in which a synchronization channel or a minimal channel is transmitted to enable a terminal in a cell area of the small base station to identify the small base station, and to enable the small base station to operate in an active mode if the deactivating unit receives a deactivation rejection message from the macro base station, the active mode being a mode of the small base station in which the small base station serves a terminal in the cell area of the small base station.

9. The small base station of claim 8, wherein the deactivating unit enables the small base station to operate in an active mode if the small base station is not in the blank state, the active mode being a mode of the small base station in which the small base station serves a terminal in the cell area of the small base station.

10. The small base station of claim 8, wherein a state in which a terminal with a communication connection does not exist in a cell area of the small base station and a location update message is not received in a preset cycle, the blank sensing unit senses the state as a blank state.

11. The small base station of claim 8, wherein a state in which a terminal camping on a cell area of the small base station does not exist, the blank sensing unit senses the state as a blank state.

12. An macro base station to control a small base station, the macro base station comprising:
   a deactivation request receiving unit to receive, from the small base station, a deactivation request message requesting permission to deactivate the small base station;
   a handover sensing unit to determine whether a terminal handed over to the small base station exists; and
   a deactivating unit to transmit, to the small base station, a deactivation response message permitting the deactivation of the small base station if a terminal handed over to the small base station is determined not to exist,
   wherein the deactivating unit transmits, to the small base station, a deactivation rejection message not permitting the deactivation of the small base station if a terminal handed over to the small base station is determined to exist.

13. A communication system, comprising:
   a small base station, a macro base station, and a terminal, wherein the small base station comprises:
   a blank sensing unit to determine whether the small base station is in a blank state; and
   a deactivating unit to transmit a deactivation request message to a macro base station if the small base station is in the blank state, and to enable the small base station to operate in an inactive mode if a deactivation response message is received from the macro base station, the inactive mode being a mode of the small base station in which a synchronization channel or a minimal channel is transmitted to enable a terminal in a cell area of the small base station to identify the small base station, and
wherein the macro base station comprises:
a deactivation request receiving unit to receive, from the small base station, a
deactivation request message requesting permission to deactivate the small base station;
a handover sensing unit to determine whether a terminal handed over to the small base station exists; and
a deactivating unit to transmit, to the small base station, a deactivation response message permitting the deactivation of the small base station if a terminal handed over to the small base station is determined not to exist,
wherein the deactivating unit of the macro base station transmits, to the small base station, a deactivation rejection message not permitting the deactivation of the small base station if a terminal handed over to the small base station is determined to exist.

* * * * *